United States Patent

[11] 3,522,839

[72] Inventors: David W. Wendt
Port Washington, Wisconsin;
Charles L. Harbeck, Pewaukee,
Wisconsin; Raymond N. Sellon, Jr.,
Shorewood, Wisconsin
[21] Application No.: 711,687
[22] Filed: March 8, 1968
[45] Patented: Aug. 4, 1970
[73] Assignee: Stolper Industries, Inc.
Menomonee Falls, Wisconsin
a Corp. of Wisconsin

[54] AIR CONDITIONER FOR HEATING, COOLING, AND PRESSURIZING VEHICLE CABS
5 Claims, Drawing Figs.

[52] U.S. Cl. .................................................... 165/44,
62/244, 62/259, 98/2-5
[51] Int. Cl. .................................................... B60h 3/00
[50] Field of Search ........................................ 165/42-44;
98/2-4, 14; 62/259RC; 62/259; 165/23; 98/25

[56] References Cited
UNITED STATES PATENTS

| | | | |
|---|---|---|---|
| 2,977,774 | 4/1961 | Ferris ............................ | 62/259X |
| 3,116,700 | 1/1964 | Aydelott ........................ | 98/3X |
| 3,315,488 | 4/1967 | Lind .............................. | 62/259X |
| 3,421,576 | 1/1969 | Roane ........................... | 165/42X |
| 2,919,907 | 1/1960 | Simon ........................... | 98/2X |
| 3,263,739 | 8/1966 | Gaskill et al. ................. | 165/44X |
| 3,417,576 | 12/1968 | Stucky .......................... | 62/259X |
| 3,428,115 | 2/1969 | Caldwell ....................... | 165/23 |

*Primary Examiner*— Robert A. O'Leary
*Assistant Examiner*— Theophil W. Streule
*Attorney*—Wheeler, Wheeler, House and Clemency ABSTRACT: Heating and cooling units assembled in a housing preferably extending across a vehicle cab above the windshield can be operated selectively to heat or cool air admitted either by recirculation from the cab or from out of doors and optionally pressurized by a fan after traversing a filter. The filter and out-of-door air inlet are preferably mounted externally of the cab but directly communicating with the housing of the interior, air circulation being controlled manually by means of dampers. The filter is externally accessible for cleaning.

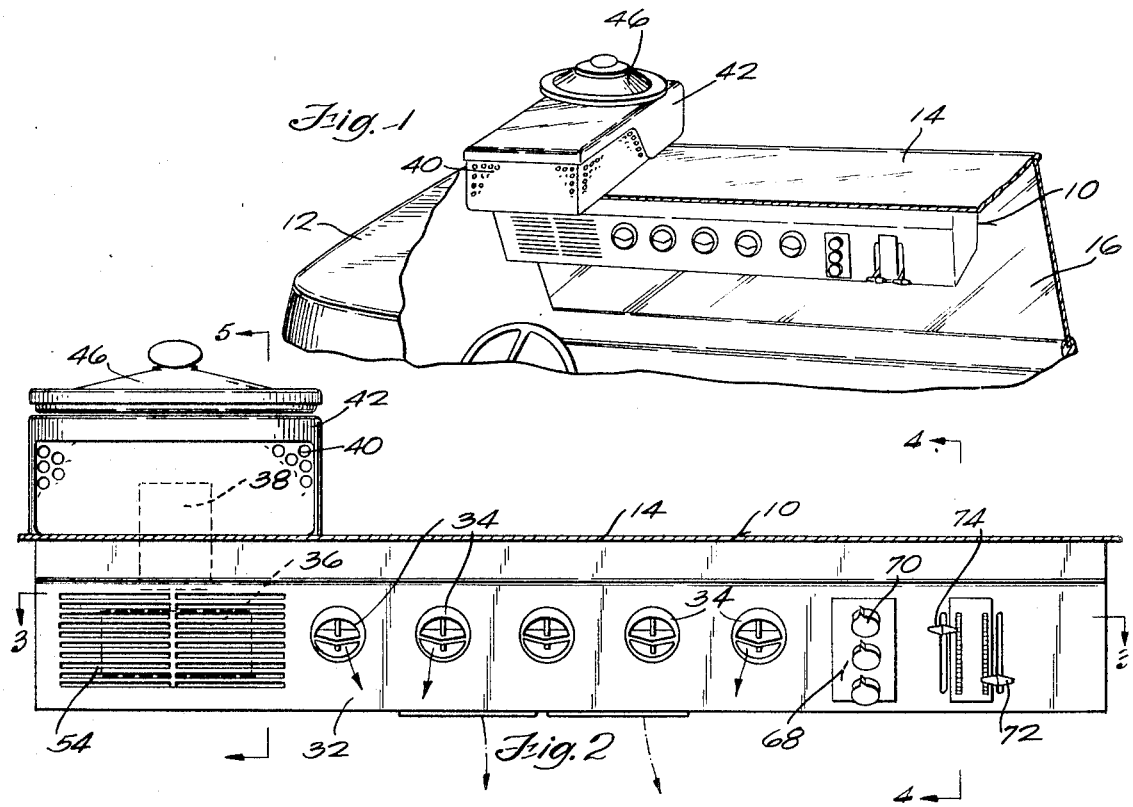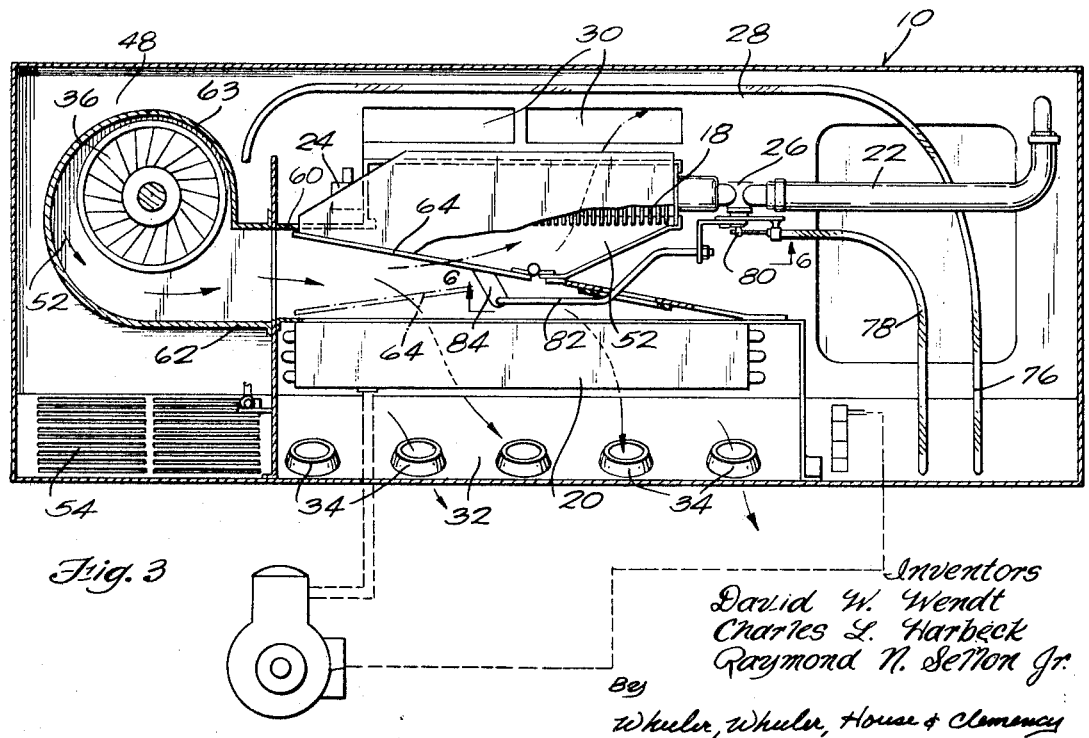

Inventors
David W. Wendt
Charles L. Harbeck
Raymond N. Sellon Jr.
By Wheler, Wheler, House & Clemency
Attorneys

U.S. PATENT 3,522,839
AIR CONDITIONER FOR HEATING, COOLING, AND PRESSURIZING VEHICLE CABS

BACKGROUND OF INVENTION

There is a long-standing need for a complete air conditioner particularly designed to render more comfortable the cabs of tractors, agricultural implements, and military vehicles where extreme conditions of heat and cold and dirt are encountered.

SUMMARY OF THE INVENTION

There are great advantages in having the fresh air inlet housing and filter disposed externally in whatever position will supply the cleanest air, the external housing for the filter having on the outside of the cab a removable cap to facilitate filter replacement.

In the disclosed organization, any desired proportions of external and internal air may be passed through the filter to a blower fan which, for compactness, may have its motor inside of the annular filter. In preferred embodiments, this places the motor largely externally with regard to the cab. Air from the outside and recirculated air from the cab can be apportioned as desired. The shutters or valves for controlling recirculating air and admission of external air are individually controllable manually, as is the motor of the blower, the latter having a 3-position switch for giving "fast" and "slow" motor speeds in addition to "stop."

The air discharged through the cooling radiator is directed back across the front seat of the cab whereas the discharge from the heating radiator is directed downwardly across the windshield for defrosting purposes as well as for heating the cab.

At least the cooler is desirably controlled by a thermostat. This can be set for any desired temperature and controls the clutch of the refrigeration compressor to interrupt the drive to the compressor whenever the desired temperature is reached.

The damper valve which determines in what relative proportion the fan-propelled air will pass through the cooler radiator or the heater radiator is desirably also connected to control a valve in the supply of engine-heated water admitted to the heater radiator, the arrangement being such that the greater the amount of air traversing the radiator, the greater will be the opening of the valve which controls hot water circulation.

Another desirable arrangement is that which permits the operator not only to choose the valve setting which will determine how much air is derived from out of doors and how much is recirculated from the cab, but also to determine what proportion of the air propelled by the blower is discharged through the heater and how much through the cooler. Although the thermostat controls only the cooler, the combination of thermostat control and control of the direction of air delivery enables the operator to maintain substantially constant temperature under all conditions.

Pressurization of air admitted from out of doors maintains the entire cab continuously at somewhat superatmospheric pressure of filtered air, thus tending to exclude dust.

BRIEF DESCRIPTION OF THE DRAWINGS

FIG. 1 is a fragmentary view in perspective looking toward the apparatus from the rear of a cab in which it is mounted, portions of the cab roof being broken away.

FIG. 2 is a view in rear elevation (as viewed in the direction of cab advance) showing one complete embodiment of the invention.

FIG. 3 is a view taken in section on the line 3--3 of FIG. 2.

DETAILED DESCRIPTION

Figure 4:
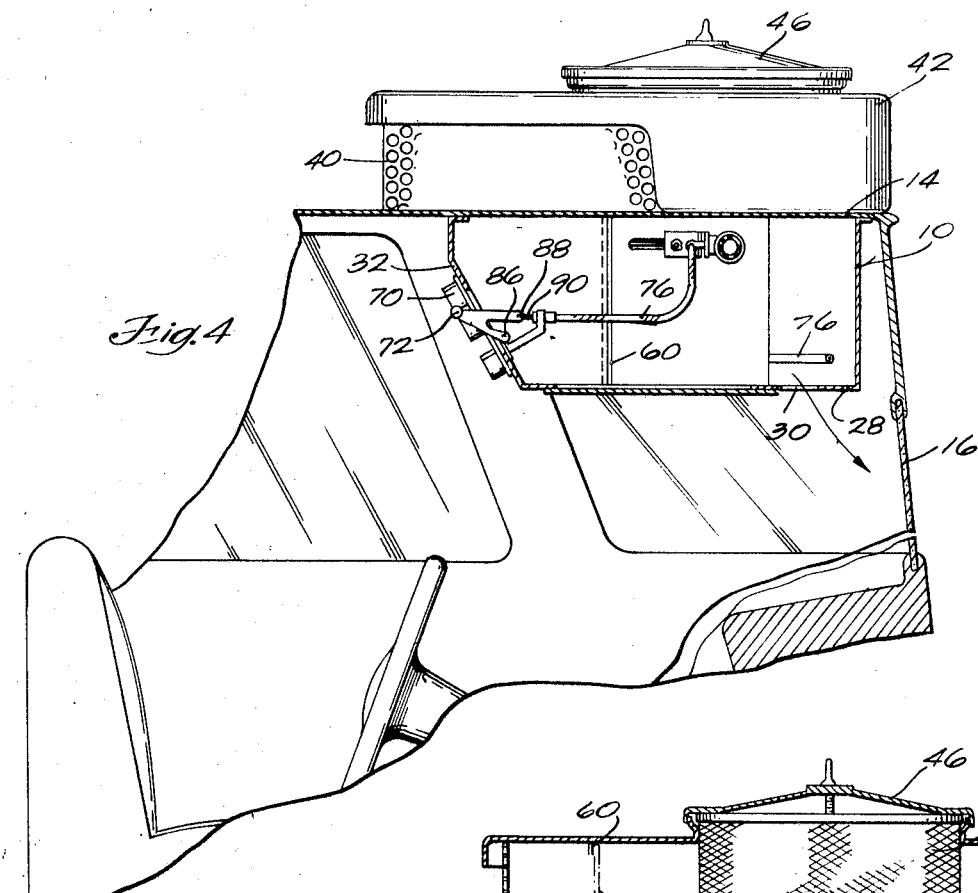
FIG. 4 is a view taken in section on the line 4--4 of FIG. 2.

An air conditioner housing 10 is preferably mounted at the top front of a vehicle cab 12 immediately beneath the cab top 14 and adjacent its windshield 16. It is broadly immaterial what kind of a vehicle supports the cab. As already indicated, it may frequently comprise a truck, a tractor, an agricultural implement, or a military vehicle. It may be assumed that the prime mover of the vehicle is an internal combustion engine, the coolant of which can be used in the heating radiator of the air conditioning unit. For the cooling radiator, a conventional heat-absorbing condensing radiator will ordinarily be used in a refrigeration system (not shown) comprising a motor-driven compressor and heat-rejecting radiator.

As best shown in FIG. 3, the housing 10 contains a heating radiator 18 near its front or windshield side, and an evaporator or other cooling radiator 20 at its rear (toward the driver's seat). A pipe 22 deriving coolant from the engine (not shown) leads to the radiator 18 and a pipe 24 leads back to the cooling radiator (not shown) or to the engine. The circulatory system includes a flow-controlling valve 26 operable as hereinafter explained. Beneath the heating radiator 18 and immediately above the windshield 16 is a foraminous bottom wall 28 provided with openings 30 for directing the hot air downwardly across the windshield 16 after it has traversed the cab heating radiator 18.

Figure 5:
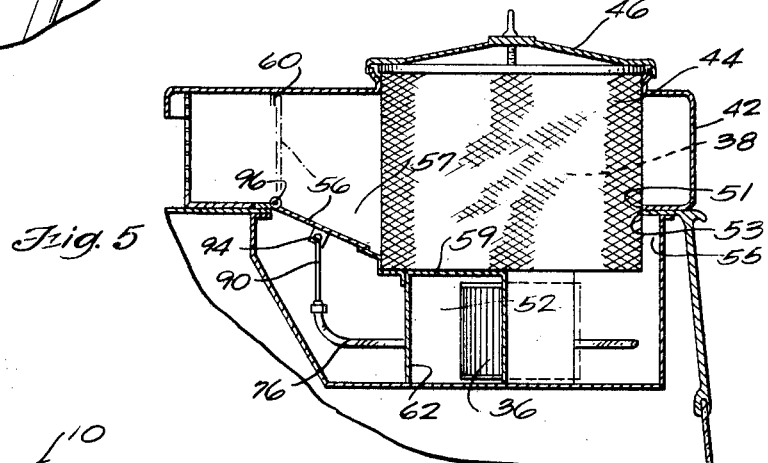
FIG. 5 is a view taken in section on the line 5--5 of FIG. 2.

The rear wall 32 is preferably obliquely inclined as shown in FIGS. 4 and 5. Where it extends in front of the cooling radiator 20, it is provided with a number of adjustable baffles 34 for controlling the direction of delivery of air which has traversed the cooling radiator 20.

The air to be passed over the respective radiators is derived in controllable proportions from two sources and pressurized by a fan rotor 36 driven by motor 38. Such of the air as comes from the exterior of the cab passes through a foraminous screen or plate 40 which is located in external housing 42 on the roof 14 of the cab. It is desired to emphasize the fact that this external housing need not be in the position illustrated. As shown, the screen 40 is at the rear. It is placed wherever dust and dirt are at a minimum whether this involves directing it rearwardly or forwardly or laterally. It need not even be on the forward lefthand side of the cab roof as shown, although this is its preferred location because it can then be directly above the housing 10 in which the various radiators and controls are disposed.

In any event, the air admitted through the screen 40 in the external housing 42 is required to pass through a filter 44 for which the housing 42 has a removable cover at 46 to enable the filter readily to be replaced outside the cab. The filter is surrounded by a plenum chamber 48 so that all sides of the cylindrical filter are exposed to receive outside air. It is convenient to locate inside the filter the motor 38 which drives the blower fan 36. Thereby the motor is cooled by incoming air. The motor extends downwardly through registering openings 51 in the exterior housing 53 in the cab top and 55 in the conditioner housing and into another plenum chamber at 52 to which the air is admitted from the interior of the filter and from which the air finds access to the interior of the blower 36.

If the air is being recirculated from the interior of the cab, it does not have to traverse the filter 44, since it is presumably already dust-free. Instead, after it passes through the grill 54 and, subject to the control of plate valve 56, it is admitted through valve-controlled port 57 directly to the plenum 52 and thence through ported partition 57 to the blower 36. In the position of the plate valve shown in FIG. 5, no air is being taken from the interior of the cab for recirculation, the port 57 being closed. In the dotted line position of valve 56 shown in FIG. 5, the port 57 for outside air is closed or substantially so and most or all of the air would be taken from the interior of the cab. Thus the operator can choose the source and proportion of the air which he desires to have heated or cooled and which will be used to pressurize his cab.

The air delivered from the blower 36 passes through a volute fan casing 62 and emerges either to the heater or cooler, or is divided therebetween, according to the position of the valve plate 64. In the full line position in which the valve 64 is illustrated in FIG. 3, all air is being deflected through the cooler to emerge in the cab through the various openings 34, which are directed toward the seat. In the dotted line position of plate 64 as shown in FIG. 3, all air would be deflected through the heating radiator 18 to emerge through openings 30 for passage downwardly over the windshield for defrosting purposes, being then used for the heating of the cab.

The blower motor 38 is controlled by a 3-position switch 68 which is on the inclined rear panel 32 of housing 10. Immediately above the switch there is a thermostat 70 which can be set for any desired cab temperature and which, when it responds, disengages the clutch which drives the compressor of the air conditioner, thereby arresting the supply of coolant to the cooling radiator 20. This direct control is preferred to a possible substitute system in which coolant chilled in an evaporator elsewhere is passed, like the heating fluid, through pipes leading to the radiator 20, the control being, in such a case, like the control afforded by valve 26 or by starting and stopping the pump which circulates the coolant through the radiator.

As stated, the air used for conditioning the cab can be derived in desired proportions either from the outside or by recirculation from the cab and it may be passed in desired proportions either through the heating radiator or the cooling radiator. In both cases the apportionment is presumably effected by hinge valve plates in the manner now to be described.

There are two levers 72 and 74 pivoted for movement through slots in the inclined rear panel 32. The lever 72 determines relative flow from the sources of air. It is connected by a Bowden wire or a similar control at 76 to the valve plate 56 shown in FIG. 5. The lever 74 controls the relative disposition of the air. This lever is connected by a Bowden wire or like control 78 to the crank 80 of hot water valve 26. The link 82 connects the valve with an arm 84 on the hingedly swingable plate 64 which determines what part of the air pressurized by fan 36 will pass through the cooling radiator 20 and what part will traverse the heating radiator 18 as shown in FIG. 3. Normally (but not necessarily) the damper plate 64 will be in one extreme position or the other. Appropriate partition means 60 provides the ports controlled by the valve or damper plates or vanes 56 and 64.

The manner in which the valve 56 is operated is illustrated in FIGS. 4 and 5. The lever 72 has a fulcrum at 86 and is pivotally connected at 88 to the reciprocable wire 90 which operates in the Bowden wire sheath 76. Where the wire 90 emerges from the sheath, it is connected at 94 to the valve plate 56 in a position close to the fulcrum 96 on which such plate is pivoted.

Figure 6:
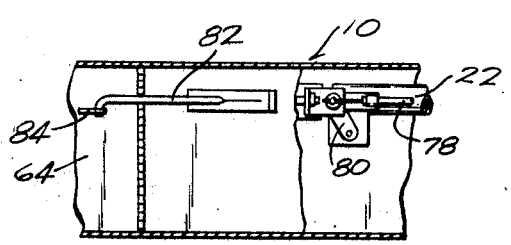
FIG. 6 is a view taken in section on the line 6--6 of FIG. 3.

The manner in which the valve 64 is operated is shown in FIGS. 3 and 6. Here the Bowden wire 78 leads to the crank 80 of the valve 26 in pipe 22, motion being thence communicated through the link 82 to the arm 84 on the hinged valve 64.

We claim:

1. A vehicle cab air conditioner comprising a housing having an admission inlet from the cab for recirculation, and having an external air admission inlet, and having a hot air outlet, and a cold air outlet, means defining a fan chamber, an air propelling fan in said chamber, a first partition means and damper for selectively admitting air from respective inlets to said fan chamber, a second partition means and damper for defining separate passages leading from the fan chamber to the respective outlets, heating and cooling radiators in the passages in the path of fan-propelled air directed to the hot air outlet and the cold air outlet respectively.

2. A vehicle cab air conditioner according to Claim 1 in further combination with a cab having a top and a windshield, the said housing being mounted near the top and the windshield, the top having an opening and having a secondary housing above the opening and communicating through the opening with the first-mentioned housing, the external air inlet being provided through the secondary housing and said opening.

3. A vehicle cab air conditioner according to Claim 2 in which said secondary housing is provided with an air filter for air en route to said fan, said secondary housing being provided with a removable closure through which said filter is accessible for change, said filter being annular in form and said fan having a motor extending upwardly through the opening in said first-mentioned housing into the second-mentioned housing and within the annular filter.

4. The combination with a vehicle cab having a top provided with an aperture, of a first housing disposed within the cab and extending across the aperture, a second housing on top of the cab top and having a screened air inlet externally of the cab and an opening communicating through the cab top aperture with the first-mentioned housing, a filter in the second housing interposed between the external air inlet of the second housing and the opening which communicates with the first housing, the second housing having an access door giving communication with said filter externally of the cab, the first-mentioned housing having a separate inlet within the cab for the admission of cab air, a fan mounted within the first-mentioned housing and having an inlet communicating with said cab air inlet, a damper valve for controlling relative flow of air from the respective inlets through the filter to the fan, said first housing having separate heating and cooling air outlets and means for guiding air from the fan to the respective outlets, damper valve means for controlling relative flow through said last-mentioned respective air guiding means, and heating and cooling radiators respectively disposed in the first housing in the path of air guided to the respective outlets.

5. The combination set forth in Claim 4 in which said fan has a motor projecting through the cab top aperture and partially disposed within said filter.